(12) United States Patent
Nazari

(10) Patent No.: US 8,230,989 B2
(45) Date of Patent: Jul. 31, 2012

(54) SHUTTLE MACHINE FOR MACHINE TOOL

(76) Inventor: Joseph Nazari, Glendale, CA (US)

( * ) Notice: Subject to any disclaimer, the term of this patent is extended or adjusted under 35 U.S.C. 154(b) by 0 days.

(21) Appl. No.: 12/970,799

(22) Filed: Dec. 16, 2010

(65) Prior Publication Data

US 2011/0083940 A1  Apr. 14, 2011

Related U.S. Application Data

(63) Continuation of application No. 11/755,989, filed on May 31, 2007, now Pat. No. 7,938,249.

(51) Int. Cl.
*B65G 21/10* (2006.01)

(52) U.S. Cl. .................. 198/468.9; 198/621.1; 198/847; 198/465.1; 198/592

(58) Field of Classification Search .................. None
See application file for complete search history.

(56) References Cited

U.S. PATENT DOCUMENTS

| | | | | |
|---|---|---|---|---|
| 5,423,202 | A | * | 6/1995 | Komatsu et al. ........... 72/405.16 |
| 5,432,202 | A | * | 7/1995 | Cherksey et al. ............. 514/626 |
| 5,737,960 | A | * | 4/1998 | Brandstetter et al. ...... 72/405.16 |
| 6,244,429 | B1 | | 6/2001 | Drewitz et al. |
| 6,659,758 | B2 | | 12/2003 | Ekendahl et al. |
| 6,701,769 | B2 | | 3/2004 | Shiroza |
| 7,047,790 | B2 | * | 5/2006 | Suzuki et al. .............. 72/405.11 |
| 7,124,616 | B2 | | 10/2006 | Kawamoto |
| 2005/0095310 | A1 | | 5/2005 | Kramer |

OTHER PUBLICATIONS

International Search Report and Written Opinion in counterpart PCT application No. PCT/US2008/064818, dated Oct. 1, 2008.

* cited by examiner

*Primary Examiner* — Kavel Singh
(74) *Attorney, Agent, or Firm* — Christie, Parker & Hale, LLP

(57) ABSTRACT

A shuttle machine for transporting work pieces for a sealing press or other machine tool is disclosed. It has two conveyers for transporting work pieces. The two conveyers are supported by a frame to move back and forth in opposite directions. When the two conveyers are in a first position, a second section of the first conveyer and a first section of the second conveyer are located near the tool, while the first second of the first conveyer and the second section of the section conveyer are accessible to first and second operators, respectively. Both operators can unload and reload work pieces simultaneously while the tool operates on the already loaded work pieces. When the conveyers are moved to a second position, the sections previously operated on are accessible for unloading and reloading, and the sections just loaded are operated on. A related operating method is also disclosed.

20 Claims, 3 Drawing Sheets

SHUTTLE MACHINE FOR MACHINE TOOL

CROSS-REFERENCE TO RELATED APPLICATION(S)

This application is a continuation of U.S. application Ser. No. 11/755,989, filed May 31, 2007 now U.S. Pat. No. 7,938,249, entitled SHUTTLE MACHINE FOR MACHINE TOOL the content of which is incorporated herein by reference.

BACKGROUND OF THE INVENTION

1. Field of the Invention

This invention relates to a shuttle machine used in a sealing press or other machine tools for transporting work pieces.

2. Description of the Related Art

FIGS. 1A-1C illustrate a conventional shuttle machine used in a sealing press for sealing product packages, such as blister-pack packages. The shuttle machine is also used in other types of machines for punching, gluing, embossing, stamping, etc. As shown in FIG. 1B, the sealing machine includes a press 12 having an upper platen 12a and a lower platen 12b, a support frame 14 situated between the two platens, and a sealing die 16 resting on the support frame 14. The sealing die 16 has a number of openings 16a into which the packages to be sealed are placed. The die 16 has two sections 16-1 and 16-2 substantially identical in size and shape, each section including one or more openings 16a. As shown in FIGS. 1B and 1C, the sealing die 16 can slide or move along guide rails 14a on the support frame 14 so that the two sections 16-1 and 16-2 are alternately located under the press 12.

In operation, two operators are located to the left and right of the sealing press, respectively. Note that terms such as "left" and "right" as used in this disclosure are with respect to the drawings. In an actual press or other machine tool, the operators may be located in the front and back of the machine (for example, the right hand side of FIG. 1B may be the front of the machine), or on the left and right sides of the machine. When the die 16 is moved to the right of the support frame as shown in FIG. 1B, the left-hand section 16-1 is located under the press and the right-hand section 16-2 is exposed and accessible to the second operator who is locate to the right of the sealing press. The second operator unloads packages that have been sealed and loads unsealed packages into the openings 16a in the right-hand section 16-2 of the die. Simultaneously, the press 12 operates to seal the packages that have been loaded into the left-hand section 16-1 of the die. When both the pressing and the unloading and reloading by the second operator are finished, the die is moved to the left (e.g. by a drive mechanism and initiated by one of the operators) into the position shown in FIG. 1 C. At this position, the right-hand section 16-2 of the die is located under the press 12 and the left-hand section 16-1 is accessible.

The first operator, located to the left of the sealing press, unloads the packages that have just been sealed and load unsealed packages into the left-hand section 16-1 of the die. Simultaneously, the press 12 operates to seal the packages that have just been loaded into the right-hand section 16-2 of the die. When both the pressing and the unloading and reloading by the first operator are finished, the die is moved to the right into the position shown in FIG. 1B.

SUMMARY OF THE INVENTION

Using the conventional shuttle machine described above, unloading/loading of one section of the die can occur simultaneously as the pressing of the other section of the die by the press, improving efficiency and throughput. However, it still contains inefficiency in that one of the operators has to wait when the other operator is unloading and reloading one section of the die and the press is pressing the other section.

An object of the present invention is to provide a shuttle machine that overcomes this inefficiency.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a shuttle machine for transporting a plurality of work pieces in a machine tool, the machine tool including a tool for operating on work pieces, the shuttle machine including: a support frame; and first and second conveyers moveably supported by the support frame for transporting work pieces, wherein each conveyer includes a first and a second section, each section being adapted for holding one or more work pieces, wherein the first and second conveyers are moveable in opposite directions between a first state and a second state, wherein in the first state, the second section of the first conveyer and the first section of the second conveyer are disposed adjacent the tool, the first section of the first conveyer is exposed and accessible to a first operator, and the second section of the second conveyer is exposed and accessible to a second operator, and wherein in the second state, the first section of the first conveyer and the second section of the second conveyer are disposed adjacent the tool, the first section of the second conveyer is exposed and accessible to a first operator, and the second section of the first conveyer is exposed and accessible to a second operator.

In another aspect, the present invention provides a method for operating the above shuttle machine, including the following steps: (a) moving the first and second conveyers to the first state; (b) unloading and reloading the first section of the first conveyer and the second section of the second conveyer while the first and second conveyers are in the first state; (c) initiate working on work pieces loaded into the second section of the first conveyer and the first section of the second conveyer while the first and second conveyers are in the first state; (d) moving the first and second conveyers to the second state; (e) unloading and reloading the first section of the second conveyer and the second section of the first conveyer while the first and second conveyers are in the second state; (f) initiate working on work pieces loaded into the first section of the first conveyer and the second section of the second conveyer while the first and second conveyers are in the second state; and (g) repeating steps (a) to (f).

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1A:
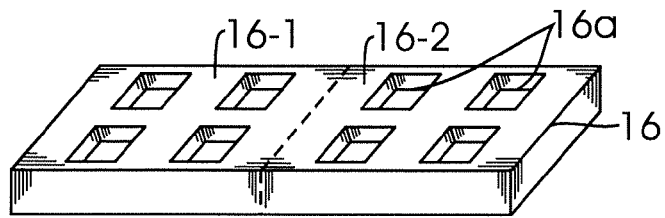
FIGS. 1A-1C illustrate a conventional shuttle machine.
Figure 1B:
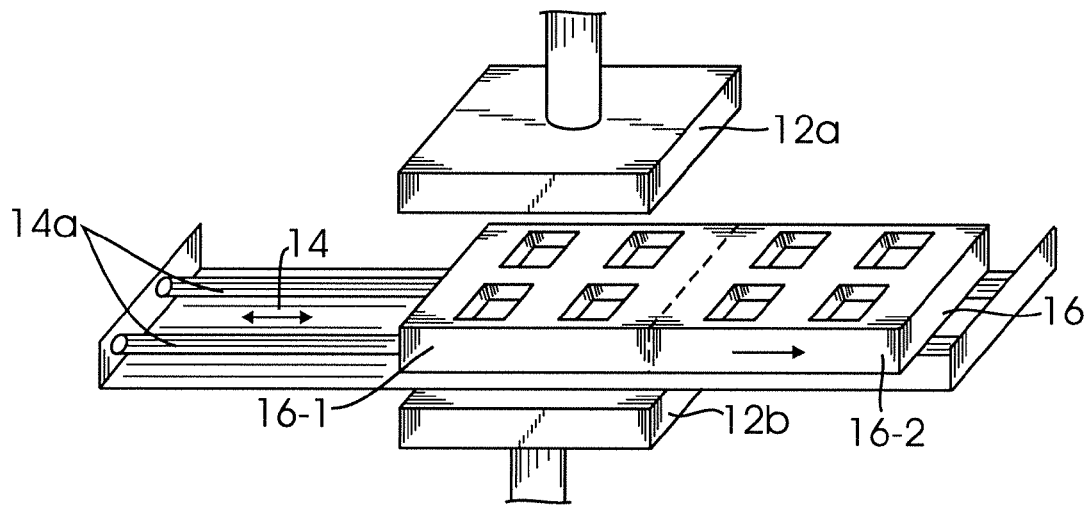
Figure 1C:
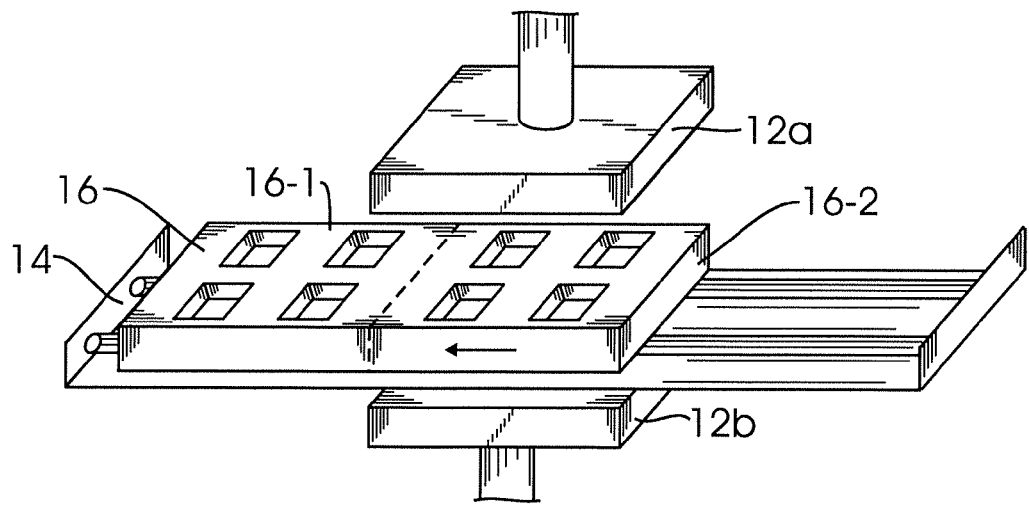
Figure 2A:
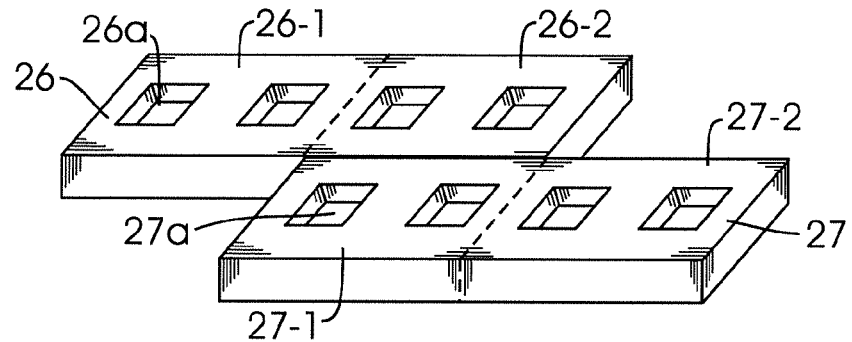
FIGS. 2A-2C illustrate a shuttle machine according to an embodiment of the present invention.

A shuttle machine according to an embodiment of the present invention is described with reference to FIGS. 2A-2C. The shuttle machine may be used in a sealing machine or other types of machine tools for punching, gluing, embossing, stamping, etc. A sealing press for sealing product packages, such as blister-pack packages is used as an example in the following descriptions.

Figure 2B:
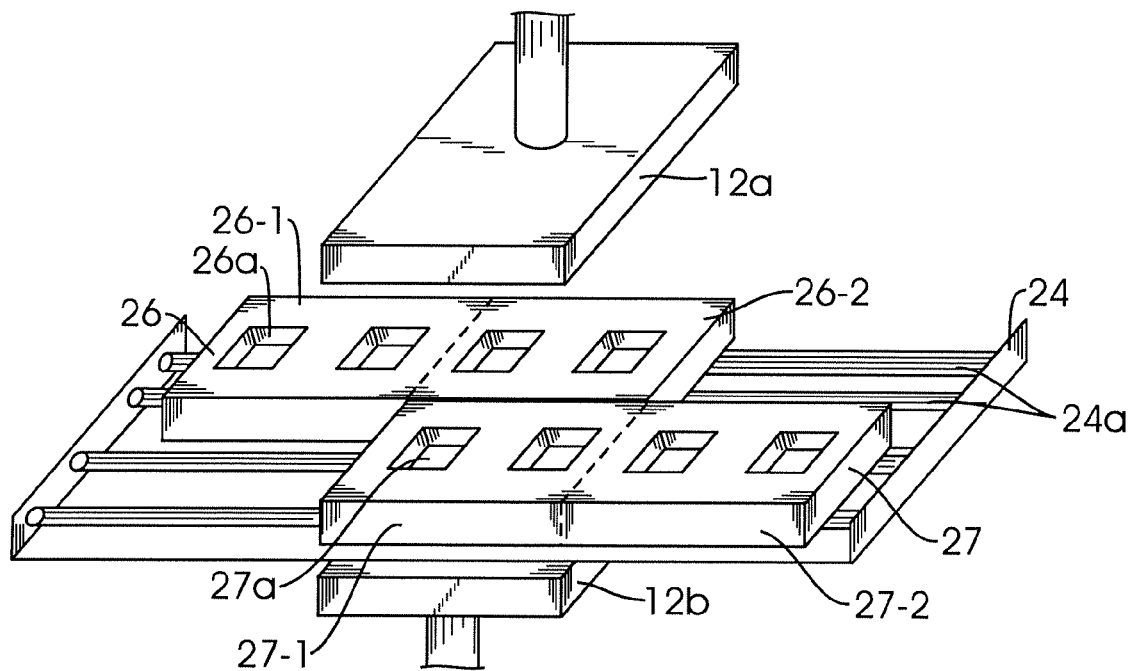

As shown in FIG. 2B, the sealing machine includes a press 12 having an upper platen 12a and a lower platen 12b, a support frame 24 situated between the two platens, and two sealing dies 26 and 27 resting on the support frame 24. Each sealing die 26, 27 has a number of openings 26a, 27a into which the packages to be sealed are placed. Each die 26, 27 has two sections 26-1 and 26-2, 27-1 and 27-2, which are substantially identical in size and shape. Each die section includes one or more openings 26a, 27a. As shown in FIGS. 2B and 2C, the sealing dies 26 and 27 can move along guide rails 24a, 24b on the support frame 24. In the illustrated embodiment, the guide rails 24a, 24b are located on the top surface of the support frame 24 and engages corresponding wheels or grooves on the bottom of the dies 26, 27. Alternatively, the guide rails may be located on the sidewalls of the support frame. Other suitable structures may also be used to support the dies 26, 27 to move on the support frame 24. In addition, the support frame may have a different structure than that shown in FIGS. 2B and 2C. For example, the support frame may be designed so that the dies are attached to the support frame on their sides rather than resting on top of the support frame.

A drive mechanism (not shown) drives the dies 26, 27 to move back and forth in opposite directions between two states. In the first state, shown in FIG. 2B, the right-hand section 26-2 of the first die 26 and the left-hand section 27-1 of the second die 27 are located under the press 12. (Note that terms such as "left" and "right" as used in this disclosure are with respect to the drawings. In an actual press or other machine tool, the operators may be located in the front and back of the machine (for example, the right hand side of FIG. 2B may be the front of the machine), or on the left and right sides of the machine.) The left-hand section 26-1 of the first die 26 is exposed and accessible to a first operator who is located to the left of the sealing press, and the right-hand section 27-2 of the second die 27 is exposed and accessible to a second operator who is located to the right of the sealing press. In the second state, shown in FIG. 2C, the left-hand section 26-1 of the first die 26 and the right-hand section 27-2 of the second die 27 are located under the press 12. The right-hand section 26-2 of the first die 26 is exposed and accessible to the second operator located to the right of the sealing press, and the left-hand section 27-1 of the second die 27 is exposed and accessible to the first operator located to the left of the sealing press.

In operation, when the dies 26 and 27 are moved to the first state, as shown in FIG. 2B, the first operator unloads packages that have been sealed and loads unsealed packages into the openings 26a in the left-hand section 26-1 of the first die 26. Simultaneously, the second operator unloads packages that have been sealed and loads unsealed packages into the openings 27a in the right-hand section 27-2 of the second die 27. Also simultaneously, the press 12 operates to seal the packages that have been loaded into the right-hand section 26-2 of the first die 26 and the left-hand section 27-1 of the second die 27. When both the pressing and the unloading and reloading by the first and second operators are finished, the dies 26, 27 are moved to the second state, as shown in FIG. 2C.

Preferably, the drive mechanism drives both dies to move simultaneously, and the moving may be initiated by either one of the operators. Alternatively, the drive mechanism drives the two dies separately, and the moving of the respective die is initiated by the operator who loaded that die.

Figure 2C:
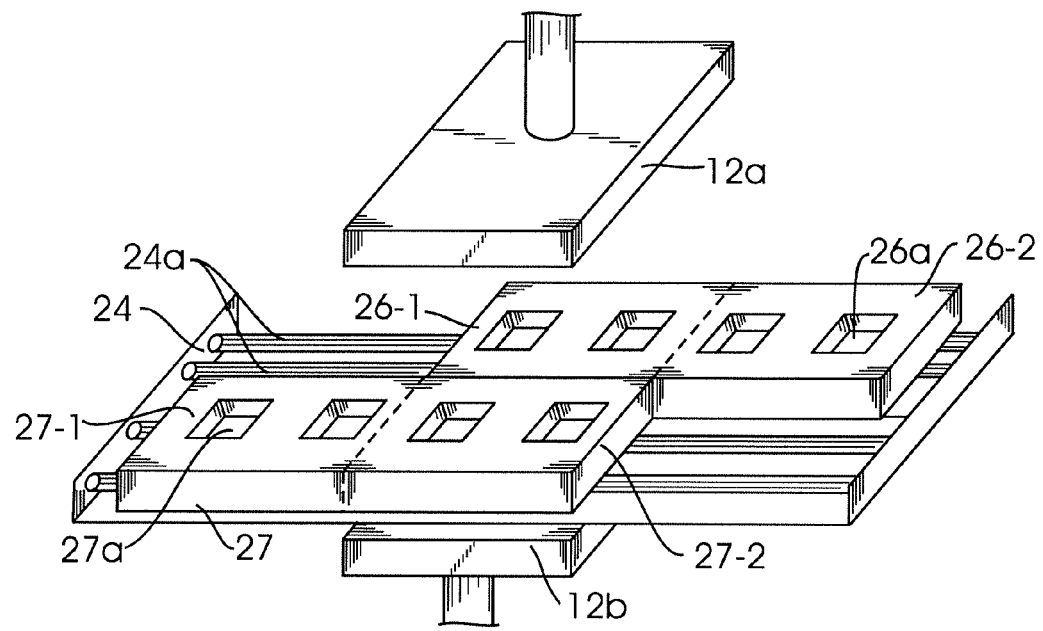

When the dies are in the second state as shown in FIG. 2C, the first operator unloads packages that have been sealed and loads unsealed packages into the openings 27a in the left-hand section 27-1 of the second die 27. Simultaneously, the second operator unloads packages that have been sealed and loads unsealed packages into the openings 26a in the right-hand section 26-2 of the first die 26. Also simultaneously, the press 12 operates to seal the packages that have been loaded into the left-hand section 26-1 of the first die 26 and the right-hand section 27-2 of the second die 27.

In an alternative embodiment, instead of the dies 26, 27, two flat carriers are disposed on top of the support frame 24. The carriers are supported to move along guide rails or other structures of the support frame 24 in a similar fashion as the dies 26 and 27 move as shown in FIGS. 2B and 2C. The carriers are tray-shaped and two dies are carried by the two carriers, respectively. Using carriers is advantage because the dies typically need to be changed frequently. The dies are tooled to have specific shapes for specific products to be sealed. By using the carriers, the dies can be easier changed by taking old dies out of the carriers and placing new dies into the carriers.

Figure 3:
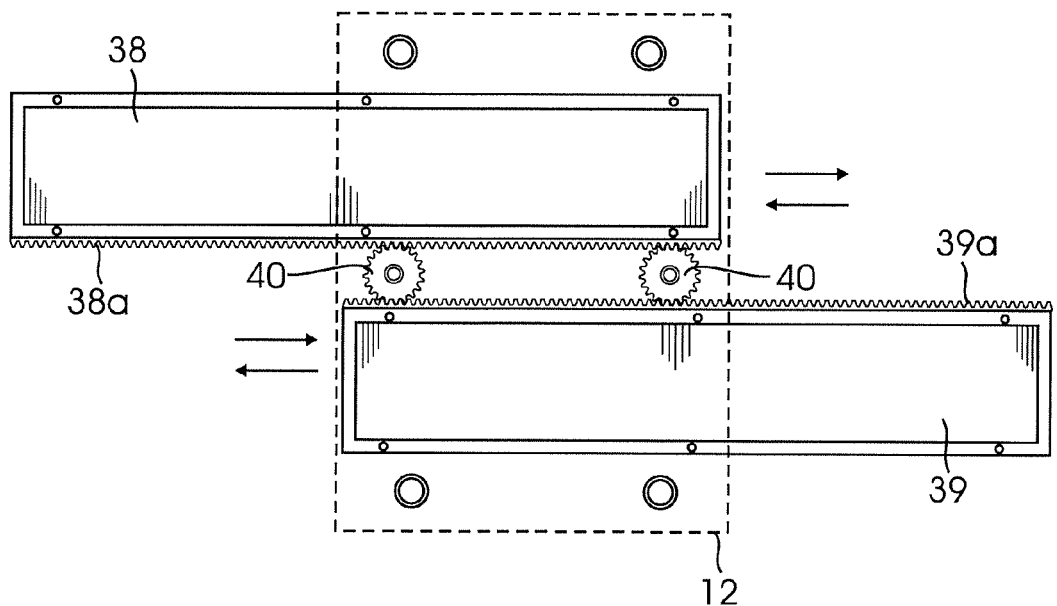
FIG. 3 illustrates a shuttle machine according to another embodiment of the present invention.

FIG. 3 is a top view illustrating a shuttle machine having two carriers according to an alternative embodiment of the present invention. The two carriers 38 and 39 are supported to move in the left-right direction along guide rails or other support structures of a support frame (not shown). The side of each carrier 38, 39 facing the other carrier is provided with a rack 38a, 39a, and one or more pinions 40 are provided between and engaging the two racks so that the two carriers move in opposite directions in a synchronized manner. The dashed lines in FIG. 3 indicate the position of the press 12. Of course, those skilled in the mechanical art will recognize that the two carriers may be implemented in many other ways.

An advantage of the shuttle machine described above is that neither operator has to wait when the other operator is loading the other side of the die as in the conventional shuttle machine. The two operators work simultaneously to unload and reload their respective section of the dies. This reduces wait time and increases efficiency.

Although a sealing press is used in the above description as an example, the shuttle machine may be used on any machine tools to transport work pieces to be processed. Depending on the type of machine tool, the tool that operates on the work pieces may be a press or other suitable tools. Similarly, the dies may be replaced by other suitable types of holders that hold the work pieces.

More generally, the shuttle machine according to embodiments of the present invention includes two moving conveyers for conveying a plurality of work pieces, where the two moving conveyers move in opposite directions. In the embodiment of FIGS. 2A-2C, each conveyer is a die. In the embodiment of FIG. 3, each conveyer includes a carrier and a die carried thereon. In other embodiments, other suitable types of holders in lieu of a die may be used to hold the work piece depending on the nature of the work piece and the tool that operate on them.

Any suitable drive mechanism may be used to drive the opposite motion of the two conveyers and its implementation is well within the abilities of those skilled in the mechanical art. The drive mechanism is preferably machine powered (electrical, hydraulic, pneumatic, a combination of them, etc.), but it can also be human powered. Further, the shuttle machine may also be constructed so that the two conveyers move (slide) on the support frame under human power without a drive mechanism.

Although in the above descriptions the operators performing the loading and unloading tasks are human operators, the term "operator" in this disclosure may also refer to mechanical devices such as robotic arms that perform the loading and unloading tasks.

Although a two-conveyer implementation is sufficient to reduce wait time and improve efficiency, the shuttle machine may include more conveyers, such as four, etc.

It will be apparent to those skilled in the art that various modification and variations can be made in the shuttle machine of the present invention without departing from the spirit or scope of the invention. Thus, it is intended that the present invention cover modifications and variations that come within the scope of the appended claims and their equivalents.

What is claimed is:

1. A sealing press shuttle machine for transporting a plurality of die members comprising:
    an upper platen and a lower platen in alignment along a vertical axis;
    a support frame having a first path and a second path, the first and second paths being parallel to each other and extending between a first end and a second end in defining a horizontal conveying axis, the horizontal conveying axis intersecting the vertical axis between the upper and lower platens;
    a first die member and a second die member slidably supported on the support frame, the first die member adapted to slide along the first path and the second die member adapted to slide along the second path, each die member having a first section and a second section;
    wherein the first and second die members are movable generally simultaneously on the support frame in their respective paths in opposite directions along the horizontal conveying axis relative to the support frame between a first state and a second state,
    wherein in the first state, the second section of the first die member and the first section of the second die member are between the upper and lower platens in vertical alignment therewith as a result of the first die member moving along the first path toward the first end and the second die member moving along the second path toward the second end, and
    wherein in the second state, the first section of the first die member and the second section of the second die member are between the upper and lower platens in vertical alignment therewith as a result of the first die member moving along the first path toward the second end and the second die member moving along the second path toward the first end.

2. The machine of claim 1, further comprising a drive mechanism for driving the first and second die members in opposite directions between the first state and the second state.

3. The machine of claim 1, wherein each die member holds at least two work pieces.

4. The machine of claim 3, wherein each die member has a plurality of openings for receiving the work pieces.

5. The machine of claim 1, wherein each die member has a rack on a side facing the other die member, the sealing press shuttle machine further including one or more pinions disposed between and engaging the racks of the first and second die members.

6. A sealing press shuttle machine for transporting a plurality of die members comprising:
    a support frame having a length between a first end and a second end defining a horizontal conveying axis, the support frame having parallel first path and a second path extending between the first end and the second end;
    a first die member adapted to slide along the first path and a second die member adapted to slide along the second path, each die member having a first section and a second section arranged along the length of the support frame;
    wherein the first and second die members are movable generally simultaneously on the support frame in their respective path in opposite directions along the horizontal conveying axis relative to the support frame between a first state and a second state,
    wherein in the first state, the second section of the first die member and the first section of the second die member are aligned along a vertical axis perpendicular to the horizontal conveying axis as a result of the first die member moving along the first path toward the first end and the second die member moving along second path toward the second end, and
    wherein in the second state, the first section of the first die member and the second section of the second die member are aligned along the vertical axis perpendicular to the horizontal conveying axis as a result of the first die member moving along the first path toward the second end and the second die member moving along the second path toward the first end.

7. The machine of claim 6, further comprising a drive mechanism for driving the first and second die members in opposite directions between the first state and the second state.

8. The machine of claim 6, wherein each die member holds at least two work pieces.

9. The machine of claim 8, wherein each die member has a plurality of openings for receiving the work pieces.

10. The machine of claim 6, wherein each die member has a rack on a side facing the other die member, the sealing press shuttle machine further including one or more pinions disposed between and engaging the racks of the first and second die members.

11. A sealing press shuttle machine for transporting a plurality of die members comprising:
    a support frame having parallel first and second paths extending a length between a first end and a second in defining a horizontal conveying axis;
    a first die member slidably supported on the first path and a second die member slidably supported on the second path, each die member having a first section and a second section arranged lengthwise along its respective path;
    wherein the first and second die members are coupled to each other to be movable generally simultaneously on the support frame in opposite directions along the horizontal conveying axis relative to the support frame between a first state and a second state,
    wherein in the first state, the second section of the first die member and the first section of the second die member are aligned along a vertical axis perpendicular to the horizontal conveying axis as a result of the first die member moving along the first path toward the first end while the second die member is moving along the second path toward the second end, wherein in the second state, the first section of the first die member and the second section of the second die member are aligned along the vertical axis perpendicular to the horizontal conveying axis as a result of the first die member moving along the first path toward the second end while the second die member is moving along the second path toward the first end.

12. The machine of claim 11, wherein the first and second die members are coupled by a pair of racks and at least one pinion.

13. The machine of claim 12, wherein a facing side of each die member carries a respective rack.

14. A method for operating a sealing press shuttle machine to transport a plurality of die members, wherein the machine includes an upper platen and a lower platen in alignment along a vertical axis, a support frame defining a first path and a second path parallel with each other along a horizontal conveying axis intersecting the vertical axis, a first die member slidably supported on the first path and a second die member slidably supported on the second path, each path having a first end and a second end, each die member having a first section and a second section, wherein the first and second die members are movable along the horizontal conveying axis on their respective path between the first and second ends relative to the support frame in opposite directions between a first state and a second state, wherein in the first state, the second section of the first die member and the first section of the second die member are between the upper and lower platens in vertical alignment therewith as a result of the first die member moving along the first path toward the first end and the second die member moving along the second path toward the second end, and wherein in the second state, the first section of the first die member and the second section of the second die member are between the upper and lower platens in vertical alignment therewith as a result of the first die member moving along the first path toward the second end and the second die member moving along the second path toward the first end, the method comprising:

(a) moving the first and second die members to the first state generally simultaneously;

(b) unloading and reloading the first section of the first die member and the second section of the second die member while the first and second die members are in the first state;

(c) initiate at least the upper platen to seal work pieces loaded into the second section of the first die member and the first section of the second die member while the first and second die members are in the first state;

(d) moving the first and second die members to the second state generally simultaneously;

(e) unloading and reloading the first section of the second die member and the second section of the first die member while the first and second die members are in the second state;

(f) initiate at least the upper platen to seal work pieces loaded into the first section of the first die member and the second section of the second die member while the first and second die members are in the second state; and (g) repeating (a) to (f).

15. A method of claim 11, wherein steps (b) and (c) are performed generally simultaneously and steps (e) and (f) are performed generally simultaneously.

16. A sealing press shuttle machine for transporting a plurality of die members comprising:

an upper platen and a lower platen in alignment along a vertical axis;

a support frame having a first path and a second path, the first and second paths being parallel to each other and extending between a first end and a second end in defining a horizontal conveying axis, the horizontal conveying axis intersecting the vertical axis between the upper and lower platens;

a first die member adapted to slide along the first path and a second die member adapted to slide along the second path, each die member having a first section and a second section;

wherein the first and second die members are movable generally simultaneously on the support frame in their respective path in opposite directions along the horizontal conveying axis relative to the support frame between a first state and a second state, wherein in the first state, the second section of the first die member and the first section of the second die member are between the upper and lower platens in vertical alignment therewith and the first section of the first die member and the second section of the second die member are exposed as a result of the first die member moving in the first path toward the first end and the second die member moving in the second path toward the second end, and wherein in the second state, the first section of the first die member and the second section of the second die member are between the upper and lower platens in vertical alignment therewith and the second section of the first die member and the first section of the second die members are exposed as a result of the first die member moving in the first path toward the second end and the second die member moving in the second path toward the first end.

17. A sealing press shuttle machine for transporting a plurality of die members comprising:

an upper platen and a lower platen in alignment along a vertical axis;

a support frame having a first path and a second path, the first and second paths being parallel to each other and extending between a first end and a second end in defining a horizontal conveying axis, the horizontal conveying axis intersecting the vertical axis between the upper and lower platens, the first and second ends being exposed from under the upper platen;

a first die member adapted to slide along the first path and a second die member adapted to slide along the second path, each die member having a first section and a second section;

wherein the first and second die members are movable generally simultaneously on the support frame in their respective path in opposite directions along the horizontal conveying axis relative to the support frame between a first state and a second state, wherein in the first state, the second section of the first die member and the first section of the second die member are between the upper and lower platens in vertical alignment therewith and the first section of the first die member and the second section of the second die member are exposed as a result of the first die member moving in the first path toward the first end and the second die member moving in the second path toward the second end, and wherein in the second state, the first section of the first die member and the second section of the second die member are between the upper and lower platens in vertical alignment therewith and the second section of the first die member and the first section of the second die members are exposed as a result of the first die member moving in the first path toward the second end and the second die member moving in the second path toward the first end.

18. The sealing press shuttle machine of claim 17, wherein the first and second paths have a common length.

19. The sealing press shuttle machine of claim 17, wherein the first ends of the first and second paths are aligned along one axis generally perpendicular to the horizontal conveying axis and the second ends of the second ends of the first and second paths are aligned along another axis generally perpendicular to the horizontal conveying axis.

20. The sealing press shuttle machine of claim 17, further comprising a drive mechanism for driving the first and second die members in opposite directions along the first and second paths, respectively.

* * * * *

UNITED STATES PATENT AND TRADEMARK OFFICE
CERTIFICATE OF CORRECTION

| | | |
|---|---|---|
| PATENT NO. | : 8,230,989 B2 | Page 1 of 1 |
| APPLICATION NO. | : 12/970799 | |
| DATED | : July 31, 2012 | |
| INVENTOR(S) | : Joseph Nazari | |

It is certified that error appears in the above-identified patent and that said Letters Patent is hereby corrected as shown below:

In the Claims

Column 6, Claim 6, line 26       After "along"

Insert -- the --

Signed and Sealed this
Twenty-third Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,230,989 B2                                   Page 1 of 1
APPLICATION NO.    : 12/970799
DATED              : July 31, 2012
INVENTOR(S)        : Joseph Nazari It is certified that error appears in the above-identified patent and that said Letters Patent is hereby corrected as shown below:

In the Specification

Column 1, line 43         Delete "locate",
                          Insert -- located --

Column 1, line 56         Delete "load",
                          Insert -- loads --

Column 3, line 26         Delete "engages",
                          Insert -- engage --

Signed and Sealed this
Third Day of September, 2013

Teresa Stanek Rea
*Acting Director of the United States Patent and Trademark Office*